United States Patent Office 2,803,658
Patented Aug. 20, 1957

2,803,658

TRICYCLIC KETONE PREPARATION

Quentin E. Thompson, Belleville, Ill., assignor to Monsanto Chemical Company, St. Louis, Mo., a corporation of Delaware No Drawing. Application December 29, 1954, Serial No. 478,515

5 Claims. (Cl. 260—586)

This invention relates to an improved process for making a tricyclic ketone, namely an anti-trans-2-keto-1,14-dimethyl-$\Delta^{6,9,11(1)}$-octahydrophenanthrene

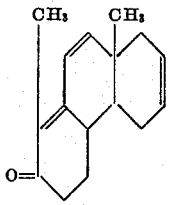

from the corresponding trans-1-formyl-1-$\gamma$-ketopentyl-2-keto-10-methyl-$\Delta^{3,6}$-hexahydronaphthalene

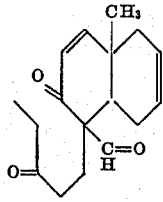

In accordance with this invention it has been found that trans-1-formyl-1-$\gamma$-ketopentyl-2-keto-10-methyl-$\Delta^{3,6}$-hexahydronaphthalene can be cyclized with alkali metal hydroxide to the corresponding tricyclic ketone in improved yields and in a more convenient manner than by processes used heretofore by employment of an aqueous acetone medium, provided the acetone is present in an amount sufficient to keep the trans-1-formyl-1-$\gamma$-ketopentyl - 2 - keto - 10 - methyl-$\Delta^{3,6}$-hexahydronaphthalene in solution.

As illustrative of the process of this invention is the following:

Example I 10 parts by weight of dl-trans-1-formyl-1-$\gamma$-ketopentyl-2-keto-10-methyl-$\Delta^{3,6}$-hexahydronaphthalene is dissolved in approximately 120 parts by weight of acetone at 25–30° C. While the solution is maintained at that temperature there is added approximately 210 parts by weight of an aqueous potassium hydroxide solution containing 10 parts by weight potassium hydroxide. The cloudy mix so obtained is agitated for 3 hours at room temperature. Thereupon 50 parts by weight of water is added, the mix cooled to 0–5° C. and agitated at that temperature for 2 hours. The mass is filtered, the filter cake washed with water and dried at 45–50° C. The dried product is dl-anti-trans-2-keto-1,14-dimethyl-$\Delta^{6,9,11(1)}$-octahydrophenanthrene (8.0 parts by weight which corresponds to a yield of 96% of theory) having a melting point of 70–71° C. and assaying 100% by ultraviolet light absorption analytical techniques.

Example II 5 parts by weight of levo rotatory isomer of trans-1-formyl-1-$\gamma$-ketopentyl - 2 - keto - 10 - methyl - $\Delta^{3,6}$ - hexahydronaphthalene is dissolved in approximately 60 parts by weight of acetone at room temperature. While at room temperature to the solution is added 105 parts by weight of aqueous potassium hydroxide solution containing 5 parts by weight potassium hydroxide. This solution is agitated for 3 hours at 25–30° C. and during this time an oily product separates. About 25% of water is added and the mixture is cooled to −15° C. and then seeded with a few crystals (obtained by cooling a few drops of the oil in the test tube to around −40° C. with scratching) of levo-anti-trans - 2 - keto - 1,14 - dimethyl-$\Delta^{6,9,11(1)}$-octahydrophenanthrene. After stirring for 2 hours the solid product is collected by filtration, washed with water and dried in a vacuum desiccator at 1 mm. at 25° C. for 24 hours. The yield is 3.7 parts by weight or 89% of theory of levo-anti-trans-2-keto-1,14-dimethyl-$\Delta^{6,9,11(1)}$-octahydrophenanthrene having a melting point of 42–44° C. and assaying approximately 100% by ultraviolet light absorption analytical techniques.

While potassium hydroxide is the preferred cyclizing agent, other alkali metal hydroxides may be employed for example sodium hydroxide.

The amount of acetone employed will be at least that sufficient to maintain the trans-1-formyl-1-$\gamma$-ketopentyl-2-keto - 10 - methyl - $\Delta^{3,6}$ - hexahydronaphthalene reactant in solution under conditions of the cyclization reaction.

The amount of water employed may vary widely but will be present in amounts sufficient to keep the alkali metal hydroxide cyclizing agent in solution throughout the reaction. In general it will be added in the form of a solvent for the alkali metal hydroxide cyclizing agent.

Ordinarily in carrying out the reaction temperatures in the range of 20–30° C. will be employed, however, any temperature below 50° C. may be used provided the system is fluid. During the crystallization of the tricyclic ketone from the reaction mass lower temperatures are employed as for example below 15° C. but not below the freezing point of the mass. It is preferred that the crystallization temperature be in the range of −20° C. to 10° C.

This application is a continuation-in-part of my copending application Serial No. 363,926, filed June 24, 1953.

What is claimed is:

1. In the method of making anti-trans-2-keto-1,14-dimethyl-$\Delta^{6,9,11(1)}$-octahydrophenanthrene, the step which comprises cyclizing trans-1-formyl-1-$\gamma$-ketopentyl-2-keto-10-methyl-$\Delta^{3,6}$-hexahydronaphthalene in a fluid aqueous-acetone medium in the presence of an alkali metal hydroxide at a temperature below 50° C., the amount of acetone employed being at least sufficient to dissolve the trans - 1 - formyl - 1 - $\gamma$ - ketopentyl - 2 - keto-10-methyl-$\Delta^{3,6}$-hexahydronaphthalene.

2. In the method of making dl-anti-trans-2-keto-1,14-dimethyl-$\Delta^{6,9,11(1)}$-octahydrophenanthrene, the step which comprises cyclizing dl-trans-1-formyl-1-$\gamma$-keto-10-methyl-$\Delta^{3,6}$-hexahydronaphthalene in a fluid aqueous-acetone medium in the presence of potassium hydroxide at a temperature in the range of 20–30° C., the amount of acetone employed being at least sufficient to dissolve dl-trans-1-formyl - 1 - $\gamma$ - ketopentyl - 2 - keto - 10 - methyl - $\Delta^{3,6}$-hexahydronaphthalene.

3. In the method of making the levo rotatory isomer of anti-trans-2-keto - 1,14 - dimethyl-$\Delta^{6,9,11(1)}$-octahydrophenanthrene, the step which comprises cyclizing the levo rotatory isomer of trans-1-formyl-1-$\gamma$-ketopentyl-2-keto-10-methyl-$\Delta^{3,6}$-hexahydronaphthalene in a fluid aqueous-acetone medium in the presence of potassium hydroxide at a temperature in the range of 20–30° C., the amount of acetone employed being at least sufficient to dissolve the levo rotatory isomer of trans-1-formyl-1-$\gamma$-ketopentyl-2-keto-10-methyl-$\Delta^{3,6}$-hexahydronaphthalene.

4. The process which comprises cyclizing *dl*-trans-1-formyl - 1 - γ - ketopentyl - 2 - keto - 10 - methyl - $\Delta^{3,6}$-hexahydronaphthalene with potassium hydroxide in an aqueous-acetone medium at a temperature in the range of 20° C. to 30° C., the amount of acetone employed being at least that sufficient to maintain *dl*-trans-1-formyl-1-γ-ketopentyl - 2 - keto - 10 - methyl - $\Delta^{3,6}$-hexahydronaphthalene in solution, cooling the reaction mass to a temperature in the range of —20° C. to 10° C., and separating therefrom *dl*-anti-trans-2-keto-1,14-dimethyl-$\Delta^{6,9,11(1)}$-octahydrophenanthrene.

5. The process which comprises cyclizing the levo rotatory isomer of trans-1-formyl-1-γ-ketopentyl-2-keto-10-methyl-$\Delta^{3,6}$-hexahydronaphthalene with potassium hydroxide in an aqueous-acetone medium at a temperature in the range of 20° C. to 30° C., the amount of acetone employed being at least that sufficient to maintain the levo rotatory isomer of trans-1-formyl-1-γ-ketopentyl-2-keto-10-methyl-$\Delta^{3,6}$-hexahydronaphthalene in solution, cooling the reaction mass to a temperature in the range of —20° C. to 10° C., and separating therefrom the levo rotatory isomer of anti-trans-2-keto-1,14-dimethyl-$\Delta^{6,9,11(1)}$-octahydrophenanthrene.

References Cited in the file of this patent

UNITED STATES PATENTS 2,672,482    Woodward  ----------- Mar. 16, 1954